United States Patent [19]
Ackrell et al.

[11] 3,716,529
[45] Feb. 13, 1973

[54] NOVEL C-16,17 SPIRO-ORTHOESTER STEROIDS AND PREPARATION

[75] Inventors: Jack Ackrell, Mountain View; John A. Edwards, Los Altos; John H. Fried, Palo Alto, all of Calif.

[73] Assignee: Syntex Corporation, Panama, Panama

[22] Filed: May 14, 1970

[21] Appl. No.: 37,292

[52] U.S. Cl. .......................260/239.55 D, 260/999
[51] Int. Cl. ............................................C07c 173/00
[58] Field of Search ....... Machine Searched Steroids

[56] References Cited

UNITED STATES PATENTS

| | | | |
|---|---|---|---|
| 3,338,926 | 8/1967 | Alvarez et al. | 260/397.4 |
| 3,546,215 | 12/1970 | Fried | 260/239.55 |
| 3,073,743 | 1/1963 | Spero | 167/65 |
| 3,073,817 | 1/1963 | Diassi et al. | 260/239.55 |
| 3,174,971 | 3/1965 | Krakower et al. | 260/239.55 |

*Primary Examiner*—Henry A. French
*Attorney*—Evelyn K. Merker, Gerard A. Blaufarb and Walter H. Dreger

[57] ABSTRACT

C-16,17 spiro-orthoesters and method of preparation involving reacting a 16,17-dihydroxy steroid with an O-alkyl alkanoic acid lactonium tetrafluoroborate in the presence of a base. The novel spiro-orthoesters are useful anti-inflammatory agents.

23 Claims, No Drawings

NOVEL C-16,17 SPIRO-ORTHOESTER STEROIDS AND PREPARATION

This invention relates to novel 16,17-spiro-orthoester steroids in the corticoid series and to a novel process for preparing these compounds using an O-alkyl alkanoic acid lactonium tetrafluoroborate in the presence of a base.

The 16,17-spiro-orthoester corticoid steroids of the present invention can be represented by the following general formulas (A) and (B):

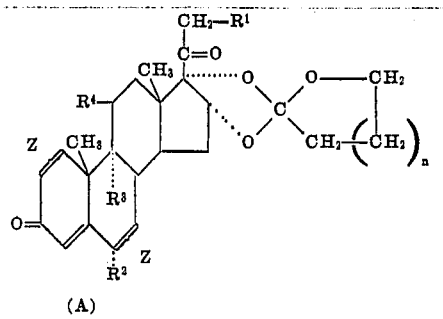

(A)

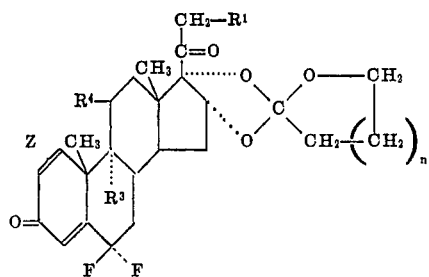

wherein, in each applicable formula, $R^1$ is hydrogen, hydroxy, fluoro, chloro, bromo, alkoxy, phenyloxy, or carboxylic acyloxy of less than 12 carbon atoms;

$R^2$ is hydrogen, fluoro, chloro, bromo, or methyl;

$R^3$ is hydrogen, chloro, fluoro, or bromo;

$R^4$ is oxygen or the group

in which $R^5$ is hydroxy or, (when $R^3$ is bromo or chloro), bromo, chloro, or fluoro;

each Z is a carbon-carbon single bond or a carbon-carbon double bond; and n is the positive integer 1,2,3, or 4.

Particularly preferred are those compounds of Formulas (A) and (B) in which $R^1$ is hydroxy, chloro, or fluoro, $R^2$ is fluoro, $R^3$ is chloro, and $R^4$ is the group

in which $R^5$ is chloro.

The novel 16,17-spiro-orthoester corticoids of the present invention possess anti-inflammatory and glucocorticoid activity. Accordingly, the present compounds are useful in the treatment of allergic diseases, collagen diseases, skin diseases, and the like. In this usage, the compounds of the present invention are administered and used in the same manner as other corticoid steroid anti-inflammatory agents, such as fluocinolone acetonide.

The process of the present invention for preparing the compounds of the present invention of formulas (A) and (B) above comprises reacting the corresponding 16α,17α-dihydroxy steroid with an O-alkyl alkanoic acid lactonium tetrafluoroborate in the presence of base.

The O-alkyl alkanoic acid lactonium tetrafluoroborate reagent is prepared by reacting together a trialkyloxonium tetrafluoroborate and an alkanoic acid lactone of four to seven carbon atoms.

In the present invention, the useful alkanoic acid lactones of four to seven carbon atoms are butyric acid lactone, pentanoic acid lactone, hexanoic acid lactone, and heptanoic acid lactone.

In the present invention, suitable trialkyloxonium tetrafluorobates include those known in the art, preferably the lower alkyl compounds, such as trimethyloxonium tetrafluoroborate, triethyloxonium tetrafluoroborate, tripropyloxonium tetrafluoroborate, and the like.

In the present invention, suitable bases include ammonia; primary alkylamines, e.g., methylamine, ethylamine, isopropylamine, n-propylamine, and the like; secondary alkyl-amines, e.g., dimethylamine, diethylamine, methylpropylamine, and the like; trialkylamines, e.g., trimethylamine, triethylamine, and the like; and monocyclic heterocyclic amines, e.g., pyridine, collidine, piperidine, morpholine, and the like.

The principal reaction hereof is conducted by reacting together a 16, 17-dihydroxy starting steroid with the O-alkyl alkanoic acid lactonium tetrafluoroborate, preferably in liquid inert organic reaction media. The reaction is conducted at temperatures ranging from about 0° to about 30° and for a period of time sufficient to complete the reaction ranging from about 5 minutes to about 1–5 hours. In the practice of this process, the reactions are contacted and maintained in any convenient order or fashion preferably within the given temperature range. After the reaction, the product is separated and isolated from the reaction mixture by any of the usual and conventional techniques such as evaporation, filtration, decantation, extraction, chromatography, and the like.

Suitable liquid inert organic reaction media in the present invention include those usually employed in organic reactions such as aromatics, e.g., benzene, toluene; ethers e.g., dioxane, diethylether, and the like; and, preferably, the halogenated hydrocarbons, e.g., chloroform, methylene chloride, carbon tetrachloride, 1,2-dichloroethane, 1,1-dichloroethane, and the like; either individually or mixtures thereof.

The reaction consumes the reactants on the basis of one equivalent of the 16α,17α-dihydroxy steroid per equivalent of the O-alkyl alkanoic acid lactonium tetrafluoroborate per equivalent of base. However, the relative amounts of the reactants employed are not critical, some of the desired product being prepared when employing any proportions thereof. In the preferred embodiments, from one to about five equivalents of each of the O-alkyl alkanoic acid lactonium tetrafluoroborate and base are employed per equivalent of 16α, 17α-dihydroxy starting steroid.

The O-alkyl alkanoic acid lactonium tetrafluoroborate is prepared by reacting together a trialkyloxonium tetrafluoroborate and an alkanoic acid lactone, preferably in liquid inert organic reaction media at from about 0° to about 20°C. and for from about 24 to 48 hours. This method is more completely described in Ber. 89, 2060 (1965), which is hereby incorporated by reference.

The process of the present invention and the process for preparing the O-alkyl alkanoic acid lactonium tetrafluoroborate are each, in the preferred embodiments, conducted under anhydrous conditions.

The process of the present invention can be practiced upon starting materials bearing the substituents defined by each of $R^1$ (when other than hydroxy), $R^2$, $R^3$, $R^4$, and Z. The starting 16α,17α-dihydroxy compounds are known and can be prepared in accordance with known procedures—see U.S. Pat. Nos. 3,048,581 and 3,053,838. If necessary, starting materials not containing a 16α-hydroxy group can be incubated with *Streptomyces Roseochromogenus* in accordance with the procedure known per se in the art. In the alternative manner, the corresponding known 16α,17α-acetonide compounds can be cleaved with acid in accordance with the procedure known per se in the art. The 16α,17α-acetonide starting compounds are also useful for preparing the corresponding 21-alkoxy and phenyloxy ethers with subsequent cleavage of the 16α,17α21 of
the 16α,17α-acetonide compounds is conducted by treating the corresponding 21-hydroxy compounds with silver oxide and an alkyl halide or phenyl halide in an inert organic solvent at a temperature from 0°C. to the reflux temperature of the reaction mixture, as set forth in U.S. patent application Ser. No. 822,049 filed May 5, 1968 now abandoned by Berkoz, Cross, Edwards, and Fried for Steroid Ethers, the discussion of this method of which application is hereby incorporated by reference.

Alternatively, the molecular substituents can be introduced after the principal reaction hereof, if more suitable from a chemical standpoint. One exception to this is the generation of the 9,11-fluorohydrin group which is best introduced prior to the preparation of the orthoester product.

The C-21 esters can be used as a protecting group when it is desired to prepare a 21-hydroxy final product, the ester being conventionally base hydrolyzed after the principal reaction hereof.

The following preparation and examples further illustrate the manner by which the present invention can be practiced and represent, in one aspect, the best mode for carrying out the invention. As such, however, they should be construed merely as illustrative and not as limitative upon the overall scope hereof.

PREPARATION 1

One gram of triethyloxonium tetrafluoroborate is dispersed in 5 ml. of dry methylene chloride under a nitrogen atmosphere. To the resultant mixture is added 0.45 ml. of butyric acid lactone while maintaining the anhydrous conditions. The resultant mixture is allowed to stand overnight at room temperature to provide a solution of O-ethyl butyric acid lactonium tetrafluoroborate.

In accordance with the foregoing procedure, the alkanoic acid lactones listed in Column A below are reacted with the trialkyloxonium tetrafluoroborates listed in Column B below to provide the respective reagents listed under Column C below.

| Column A | Column B |
|---|---|
| butyric acid lactone | trimethyloxonium tetrafluoroborate |
| pentanoic acid lactone | triethyloxonium tetrafluoroborate |
| hexanoic acid lactone | tri-n-propyloxonium tetrafluoroborate |
| heptanoic acid lactone | |

Column C

O-methyl butyric acid lactonium tetrafluoroborate
O-ethyl butyric acid lactonium tetrafluoroborate
O-n-propyl butyric acid lactonium tetrafluoroborate
O-methyl pentanoic acid lactonium tetrafluoroborate
O-ethyl pentanoic acid lactonium tetrafluoroborate
O-n-propyl pentanoic acid lactonium tetrafluoroborate
O-methyl hexanoic acid lactonium tetrafluoroborate
O-ethyl hexanoic acid lactonium tetrafluoroborate
O-n-propyl hexanoic acid hexanoic acid lactonium tetrafluoroborate
O-methyl heptanoic acid lactonium tetrafluoroborate
O-ethyl heptanoic acid lactonium tetrafluoroborate
O-n-propyl heptanoic acid lactonium tetrafluoroborate

EXAMPLE 1

6α-fluoro-9α,11β-dichloro-21-acetoxypregna-1,4-diene-16α,17α-diol-3,20-dione (115 mg.) is dispersed in 4.5 ml. of dry methylene chloride containing 50 mg. of dry triethylamine. To the resultant mixture is added 0.4 ml. of the O-ethyl butyric acid lactonium tetrafluoroborate solution prepared in Preparation 1 in a dropwise fashion and at room temperature with stirring over a period of 10 minutes. The resultant mixture is then filtered through a column of alumina and then crystallized to yield the 6α-fluoro-9α,11β-dichloro-16 α,17α-oxolan-2',2'-ylidenedioxy-21-acetoxypregna-1,4-diene-3,20-dione.

EXAMPLE 2

6α,9α-difluoro-21-chloropregna-1,4-diene-11β,16α,17-triol-3,20-dione (100 mg.) is dispersed in 10 ml. of dry methylene chloride containing 50 mg. of dry trimethylamine. To the resultant solution is then added 0.4 ml. of the O-ethylbutyric acid lactonium tetrafluoroborate solution prepared in Preparation 1 in a dropwise fashion and at room temperature with stirring over a period of 10 minutes. The resultant reaction mixture is then filtered through a column of alumina and subjected to preparative thin layer chromatography to provide the 6α,9α-difluoro-16α,17α-oxolan-2',2'21-chloropregna-1,4-dien-11β-ol-3,20-dione.

EXAMPLE 3

6α,9α-difluoro-21-acetoxypregna-1,4-diene-11β,16α,17α-triol-3,20-dione (150 mg.) and 150 mg. of triethylamine are dispersed in 10 ml. of methylene chloride at room temperature with stirring. To the resultant mixture is added 0.6 ml. of a solution of O-ethyl butyric acid lactonium tetrafluoroborate as prepared in Preparation 1 with stirring and over a period of 15 minutes. After this time, the reaction mixture is poured into water and extracted with chloroform. The chloroform extracts are subjected to preparative thin layer chromatography to provide the 6α,9α-difluoro-16α,17α-oxolan-2',2'-ylidenedioxy-21-acetoxy-pregna-1,4-dien-11β-ol-3,20-dione product.

EXAMPLE 4

6,6-difluoro-21-acetoxypregna-1,4-diene-11β,16α,17α-triol-3,20-dione (150 mg.) is dispersed in 15 ml. of chloroform containing 100 mg. of methylamine at room temperature and with stirring. To the resultant mixture is added 0.5 ml. of a solution of O-methyl pentanoic acid lactonium tetrafluoroborate, as prepared in Preparation 1, in a dropwise fashion over a period of 25 minutes at room temperature and with stirring. After the addition, the reaction mixture is filtered through a column of alumina and subjected to preparative thin layer chromatography to provide the 6,6-difluoro-16α,17α-oxan-2',2'-ylidenedioxy-21-acetoxypregna-1,4-dien-11β-ol-3,20-dione product.

EXAMPLE 5

The procedure of Example 3 is repeated using, in lieu of O-ethyl butyric acid lactonium tetrafluoroborate reagent, each of O-ethyl hexanoic acid lactonium tetrafluoroborate and O-ethyl heptanoic acid lactonium tetrafluoroborate to provide 6α,9α-difluoro-16α,17α2',2'-ylidenedioxy-21-acetoxypregna-1,4-dien-11β-ol-3,20-dione and 6α,9α-difluoro-16α,17α2', 2'-ylidenedioxy-21-acetoxypregna-1,4-dien-11β-ol-3,20-dione respectively.

EXAMPLE 6

To a solution of 1 g. of 6α,9α-difluoro-16α,17α-oxolan-2',2'-ylidenedioxy-21-acetoxypregna-1,4-dien-11β-ol-3,20-dione in 50 ml. of methanol is left for 3 hours with a 5 percent solution of potassium hydroxide in 10 ml. of water at 0° under nitrogen. The reaction mixture is then poured into ice water and the solid which forms is collected by filtration, washed with water to neutrality and dried to yield 6α,9α-difluoro-16α,17α-oxolan-2',2'1,4-diene-11β,21-diol-3,20-dione which is recrystallized from methylene chloride:ether.

In like manner, the foregoing hydrolysis procedure can be utilized to prepare the other 16α,17α-spiro-ortho-ester products hereof containing a 21-hydroxyl.

EXAMPLE 7

The procedures of Examples 1, 2, 3, and 4 are repeated utilizing, in lieu of the inert liquid organic reaction media used therein, the inert liquid organic reaction media set forth in Column D below, and, in addition, utilizing, in lieu of the amine used in these examples, those amines set forth in Column E below, with similar results in each instance.

| Column D | Column E |
| --- | --- |
| carbon tetrachloride | |
| chloromethane | ethyl amine |
| diethyl ether | di-n-propyl amine |
| dioxane | isopropyl amine |
| toluene | pyridine |
| mesitylene | collidine |

Similarly, the foregoing modifications, when employed at a temperature of 0°, affords similar results in each instance.

EXAMPLE 8

The procedures of Examples 1 and 2 are repeated employing, in lieu of O-ethyl butyric acid lactonium tetrafluoroborate, O-methyl pentanoic acid lactonium tetrafluoroborate to provide the 6α-fluoro-9α,11β-dichloro-16α,17α-oxan-2',2'-ylidenedioxy-21-acetoxypregna-1,4-diene-3,20-dione and 6α,9α-difluoro-16α,17α2',2'-ylidenedioxy-21-chloropregna-1,4-dien-11β-ol-3,20-dione products, respectively.

EXAMPLES 9 to 37

In accordance with the foregoing procedures, the following products are prepared by reacting the corresponding 16α,17α-dihydroxy starting steroid with the appropriate O-alkyl alkanoic acid lactonium tetrafluoroborate reagent.

16α,17α-oxolan-2',2'-ylidenedioxypregna-4-ene-3,11,21-trione,

16α,17α-oxolan-2',2'-ylidenedioxypregna-1,4-diene-11β,21-diol-3,20-dione,

16α,17α-oxan-2',2'-ylidenedioxypregna-1,4-diene-11β,21-diol-3,20-dione,

16α,17α-oxolan-2',2'-ylidenedioxy-21-acetoxypregna-1,4-diene-11β-ol-3,20-dione,

16α,17α-oxepan-2',2'-ylidenedioxy-21-acetoxypregna-1,4-dien-11β-ol-3,20-dione,

6α,21-difluoro-16α,17α-oxocan-2',2'-ylidenedioxypregna-1,4,6-trien-11β-ol-3,20-dione 6α-methyl-16α,17α-oxan-2',2'-ylidenedioxy-21-chloropregna-4,6-dien-11β-ol-3,20-dione, 9α,11β,21-trichloro-16α,17α-oxepan-2',2'-ylidenedioxy-pregna-1,4,6-triene-3,20-dione, 9α,11β,21-trichloro-16α,17α-oxepan-2',2'-ylidenedioxy-pregna-1,4-diene-3,20-dione, 6α,9α-difluoro-16α,17α-oxolan-2',2'-ylidenedioxypregna-4-en-11β-ol-3,20-dione, 16α,17α-oxan-2',2'-ylidenedioxy-21-methoxypregna-1,4-dien-11β-ol-3,20-dione, 6α-methyl-9α,11β-dichloro-16α,17α-oxepan-2',2'-ylidenedioxy-21-phenyloxypregna-4,6-diene-3,20-dione, 6α-chloro-16α,17α-oxolan-2',2'-ylidenedioxypregn-4-ene-11β,21-diol-3,20-dione, 9α,11β-dibromo-16β,17β-oxan-2',2'-ylidenedioxy-21-acetoxy-pregna-4,6-diene-3,20-dione, 6α,9α,11β-tribromo-16α,17α-oxepan-2',2'-ylidenedioxypregn-4-en-21-ol-3,20-dione, 16α,17α-oxocan-2',2'-ylidenedioxy-21-bromopregna-1,4-dien-11β-ol-3,20-dione, 6α-fluoro-9α,11β,21-trichloro-16α,17α-oxolan-2',2'-ylidene-dioxypregna-1,4-dien-3,20-dione, 6α,21-difluoro-9α,11β-dichloro-16α,17α-oxolan-2',2'-ylidenedioxy-pregna-1,4-dien-21-ol-3, 20-dione, 6α-fluoro-9α,11β-dichloro-16α,17α-oxolan-2',2'-ylidenedioxy-pregna-1,4-dien-21-ol-3,20-dione,
6α-fluoro-9α,11β,21-trichloro-16α,17α-oxan-2',2'-ylidene-dioxypregna-1,4-diene-3,20-dione,
6α,21-difluoro-9α,11β-dichloro-16α,17α-oxan-2'-ylidenedioxy-pregna-1,4-diene-3,20-dione,
6α-fluoro-9α,11β-dichloro-16α,17α-oxan-2',2'-ylidenedioxy-pregna-1,4-dien-21-ol-3,20-dione,
6,6-difluoro-16α,17α-oxolan-2',2'-ylidenedioxypregn-4-ene-3,11,20-trione,
6,6-difluoro-16α,17α-oxolan-2',2'-ylidenedioxypregna-1,4-diene-11β,21-diol-3,20-dione,
6,6-difluoro-16α,17α-oxan-2',2'-ylidenedioxypregna-1,4-diene-11β,21-diol-3,20-dione,
6,6-difluoro-16α,17α-oxolan-2',2'-ylidenedioxy-21-acetoxy-pregna-1,4-dien-11β-ol-3,20-dione,
6,6-dilfuoro-16α,17α-oxepan-2',2'-ylidenedioxy-21-acetoxy-pregna-1,4-dien-11β-ol-3,20-dione,
6,6,21-trifluoro-16α,17α-oxocan-2',2'-ylidenedioxypregna-1,4-dien-11β-ol-3,20-dione, and
6,6,9α,21-tetrafluoro-16α,17α-oxan-2',2'-ylidenedioxypregn-4-ene-3,11,20-trione,
6α-fluoro-9α,11β-dichloro-16α,17α-oxolan-2',2'-ylidenedioxy-21-acetoxypregna-1,4-diene-3,20-dione,
6,6-difluoro-9α,11β-dichloro-16α,17α-oxolan-2',2'-ylidene-dioxy-21-acetoxypregna-1,4-diene-3,20-dione,
6,6,9α-trichloro-16α,17α-oxolan-2',2'-ylidenedioxy-21-chloropregna-1,4-dien-11β-ol-3,20-dione,
6,6,9α-trifluoro-16α,17α-oxolan-2',2'-ylidenedioxy-21-acetoxypregna-1,4-dien-11β-ol-3,20-dione,
6,6-difluoro-9α,11β-dichloro-16α,17α-oxolan-2',2'-ylidene-dioxypregna-1,4-dien-21-ol-3,20-dione,
6,6-difluoro-9α,11β,21-trichloro-16α,17α-oxolan-2',2'-ylidene-dioxypregna-1,4-diene-3,20-dione,
6,6,21-trifluoro-9α,11β-dichloro-16α,17α-oxolan-2',2'-ylidene-dioxypregna-1,4-diene-3,20-dione.

What is claimed is:

1. A compound selected from those represented by Formulas (A) and (B):

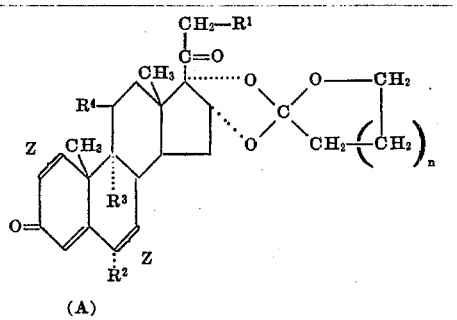

(A)

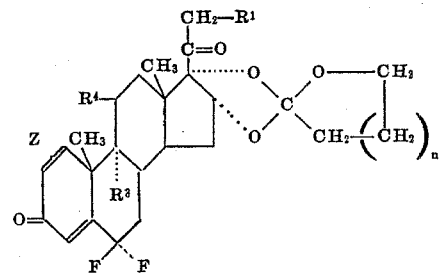

wherein, in each applicable formula,

R¹ is hydrogen, hydroxy, fluoro, chloro, bromo, alkoxy, phenyloxy, or carboxylic acyloxy of less than 12 carbon atoms;
R² is hydrogen, fluoro, chloro, bromo, or methyl;
R³ is hydrogen, chloro, fluoro, or bromo;
R⁴ is oxygen or the group

in which R⁵ is hydroxy or, (when R³ is bromo or chloro), bromo, chloro, or fluoro;
each Z is a carbon-carbon single bond or a carbon-carbon double bond; and
n is the positive integer 1, 2, 3, or 4.

2. A compound selected from those represented by Formula A of claim 1.

3. A compound selective from those of claim 2 wherein N is the positive integer 1.

4. A compound selected from those of claim 3 wherein R¹ i hydroxy, chloro or fluoro, R² is fluoro, R³ is chloro, and R⁴ is the group

in which R⁵ is chloro.

5. The compound selected from those of claim 3 which is 6α-fluoro-9α,11β-dichloro-16α,17α-oxolan-2',2'-ylidene-dioxy-21-acetoxypregna-1,4-diene-3,20-dione.

6. The compound selected from those of claim 3 which is 6α,9α-difluoro-16α,17α-oxolan-2',2'-ylidenedioxy-21-chloropregna-1,4-dien-11β-ol-3,20-dione.

7. The compound selected from those of claim 3 which is 6α,9α-difluoro-16α,17α-oxolan-2',2'-ylidenedioxy-21-acetoxypregna-1,4-dien-11β-ol-3,20-dione.

8. The compound selected from those of claim 3 which is 16α,17α-oxolan-2',2'-ylidenedioxypregna-1,4-diene-11β,21-diol-3,20-dione.

9. The compound selected from those of claim 3 which is 16α,17α-oxolan-2',2'-ylidenedioxy-21-acetoxypregna-1,4-dien-11β-ol-3,20-dione.

10. The compound selected from those of claim 3 which is 6α-fluoro-9α,11β-dichloro-16α,17α-oxolan-2',2'-ylidene-dioxypregna-1,4-dien-21-ol-3,20-dione.

11. The compound selected from those of claim 3 which is 6α-fluoro-9α,11β,21-trichloro-16α,17α-oxolan-2',2'-ylidenedioxypregna-1,4-diene-3,20-dione.

12. The compound selected from those of claim 3 which is 6α,21-difluoro-9α,11β-dichloro-16α,17α-oxolan-2',2'-ylidenedioxypregna-1,4-diene-3,20-dione.

13. A compound selected from those represented by Formula B of claim 1.

14. A compound selected from those represented in claim 13 wherein n is the positive integer 1.

15. The compound selected from those of claim 14 wherein R¹ is hydroxy, chloro, or fluoro, R³ is chloro, and R⁴ is the group

in which R⁵ is chloro.

16. The compound selected from those of claim 14 which is 6,6-difluoro-9α,11β-dichloro-16α,17α-oxolan-2',2'-ylidenedioxy-21-acetoxypregna-1,4-diene-3,20-dione.

17. The compound selected from those of claim 14 which is 6,6,9α-trifluoro-16α,17α-oxolan-2',2'-ylidenedioxy-21-chloropregna-1,4-dien-11β-ol-3,20-dione.

18. The compound selected from those of claim 14 which is 6,6,9α-trifluoro-16α,17α-oxolan-2',2'-ylidenedioxy-21-acetoxypregna-1,4-dien-11β-ol-3,20-dione.

19. The compound selected from those of claim 14 which is 6,6-difluoro-16α,17α-oxolan-2',2'-ylidenedioxy-pregna-1,4-diene-11β,21-diol-3,20-dione.

20. The compound selected from those of claim 14 which is 6,6-difluoro-16α,17α-oxolan-2',2'-ylidenedioxy-21-acetoxypregna-1,4-dien-11β-ol-3,20-dione.

21. The compound selected from those of claim 14 which is 6,6-difluoro-9α,11β-dichloro-16α,17α-oxolan-2',2'-ylidenedioxypregna-1,4-diene-21-ol-3,20-dione.

22. The compound selected from those of claim 14 which is 6,6-difluoro-9α,11β,21-trichloro-16α,17α-oxolan-2',2'-ylidenedioxypregna-1,4-diene-3,20-dione.

23. The compound selected from those of claim 14 which is 6,6,21-trifluoro-9α,11β-dichloro-16α,17α-oxolan-2',2'-ylidenedioxypregna-1,4-diene-3,20-dione.

* * * * *